(12) United States Patent
Ogawa et al.

(10) Patent No.: US 9,114,532 B2
(45) Date of Patent: Aug. 25, 2015

(54) APPARATUS FOR CONTROLLING MOBILE ROBOT

(71) Applicant: HONDA MOTOR CO., LTD., Tokyo (JP)

(72) Inventors: Naohide Ogawa, Wako (JP); Katsuyoshi Watari, Wako (JP); Kaoru Toba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 13/890,389

(22) Filed: May 9, 2013

(65) Prior Publication Data
US 2014/0005827 A1 Jan. 2, 2014

(30) Foreign Application Priority Data
Jun. 28, 2012 (JP) ................. 2012-145689

(51) Int. Cl.
*B25J 9/16* (2006.01)
*G05D 1/02* (2006.01)

(52) U.S. Cl.
CPC .............. *B25J 9/1674* (2013.01); *G05D 1/021* (2013.01); *G05D 1/027* (2013.01); *G05D 1/0255* (2013.01); *G05D 1/0272* (2013.01); *G05B 2219/39091* (2013.01); *G05D 2201/0217* (2013.01); *Y10S 901/01* (2013.01)

(58) Field of Classification Search
CPC ........ B25J 19/06; B25J 9/1674; B25J 9/1676; G05B 2219/39091; G05B 2219/40559; G05D 2201/0217
See application file for complete search history.

(56) References Cited

U.S. PATENT DOCUMENTS

2007/0135966 A1* 6/2007 Kawaguchi et al. .......... 700/245
2007/0150106 A1* 6/2007 Hashimoto et al. ........... 700/245

FOREIGN PATENT DOCUMENTS

JP 4171510 10/2008
WO WO2012080130 A1 * 6/2012

* cited by examiner

Primary Examiner — Khoi Tran
Assistant Examiner — Robert Nguyen
(74) Attorney, Agent, or Firm — Rankin, Hill & Clark LLP (57) ABSTRACT

In an apparatus for controlling a mobile robot having movement mechanisms and work mechanisms both connected to a body, actuators for driving them, and a controller for controlling an action of the movement mechanisms and the work mechanisms through the actuators, the controller comprises a person detector to detect a person located in a vicinity of the robot, a position determiner to determine whether the position of the detected person is within a first range or a second range, and a regulator to regulate the actions of the movement mechanisms and the work mechanisms when the position of the detected person is determined to be within the first range or the second range.

14 Claims, 10 Drawing Sheets

APPARATUS FOR CONTROLLING MOBILE ROBOT

BACKGROUND

1. Technical Field

This invention relates to an apparatus for controlling a mobile robot, more particularly to an apparatus for controlling actions of the mobile robot when a person is present nearby.

2. Background Art

A mobile robot may move and work in a space where people are present and therefore must avoid physical contact with people. There is known a technique to change the moving path of a robot when a person in a nearby location is detected, as taught, for example, by Japanese Patent No. 4171510.

The reference is configured to change the moving path based on the recognition that immediately changing the robot's behavior would evoke a change in the person's behavior, which would increase the likelihood of contact rather than lower it.

SUMMARY

When the distance to the detected person offers some leeway, contact can be effectively avoided by changing the moving path. However, when the person is located relatively close, such as within the range of work mechanism length, contact must be avoided by suitably controlling the actions of the robot before changing the moving path. Notwithstanding, the reference is altogether silent on this point.

An object of this invention is to overcome the aforesaid problem by providing an apparatus for controlling a mobile robot that can avoid contact even with a person detected at a relatively nearby location.

In order to achieve the object, embodiments of this invention provides in a first aspect an apparatus for controlling a mobile robot having a body, movement mechanisms for walking operation and work mechanisms for working operation both connected to the body, a plurality of actuators for driving the movement mechanisms and the work mechanisms, and a controller for controlling an action of the movement mechanisms and the work mechanisms through the actuators, wherein the controller comprises: a person detector that detects a person located in a vicinity of the robot; a position determiner that determines whether the position of the detected person is within a first range defined based on a length of the work mechanisms of the robot, or a second range defined based on a gravity length of the robot; and a regulator that regulates the actions of the movement mechanisms and the work mechanisms when the position of the detected person is determined to be within the first range or the second range.

In order to achieve the object, an embodiment of this invention provides in a second aspect a method for controlling a mobile robot having a body, movement mechanisms for walking operation and work mechanisms for working operation both connected to the body, a plurality of actuators for driving the movement mechanisms and the work mechanisms, and a controller for controlling an action of the movement mechanisms and the work mechanisms through the actuators, comprising the steps of: detecting a person located in a vicinity of the robot; determining whether the position of the detected person is within a first range defined based on a length of the work mechanisms of the robot, or a second range defined based on a gravity length of the robot; and regulating the actions of the movement mechanisms and the work mechanisms when the position of the detected person is determined to be within the first range or the second range.

DESCRIPTION OF EMBODIMENT

Embodiments for implementing an apparatus for controlling a mobile robot according to this invention are explained with reference to the drawings in the following.

Figure 1:
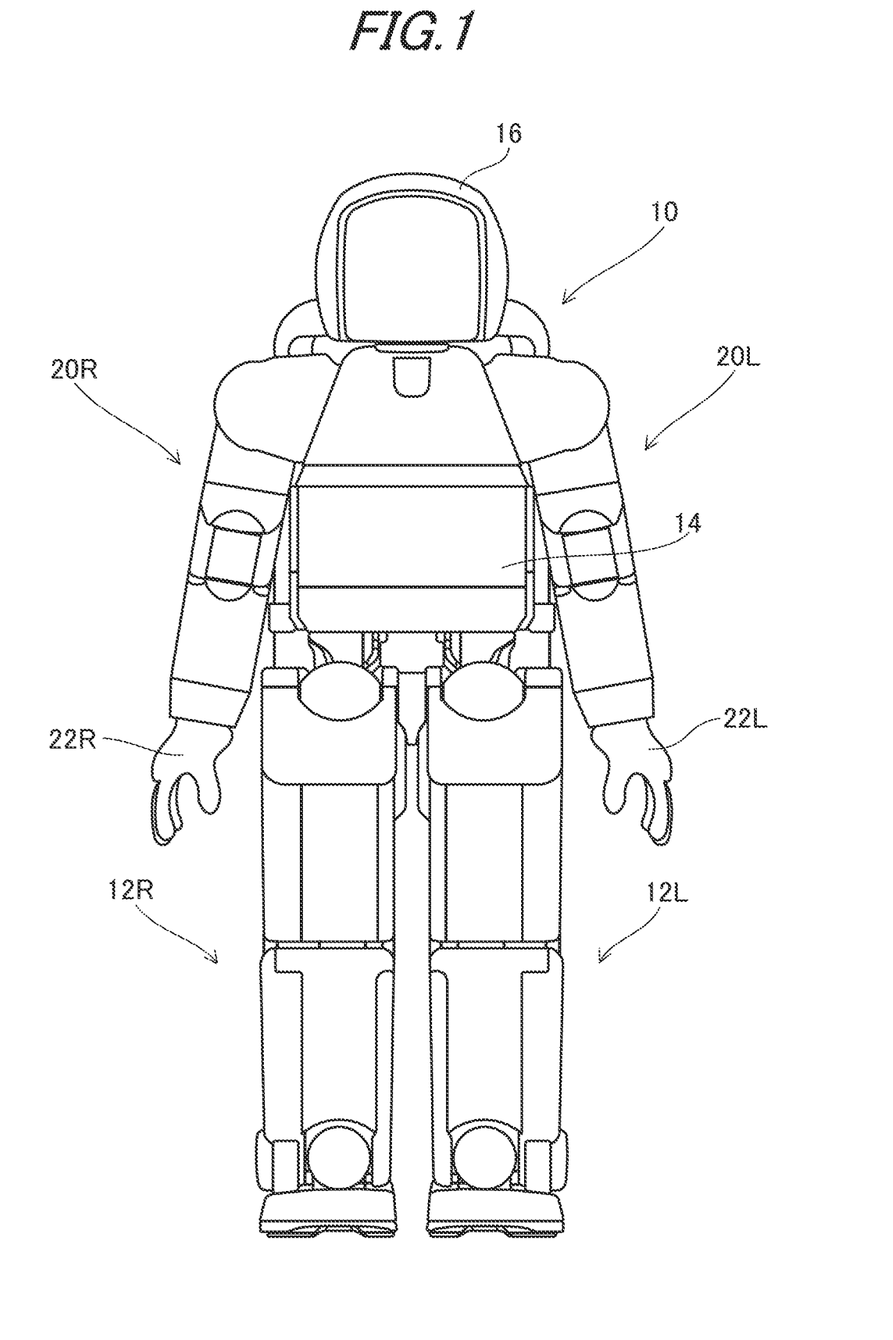
FIG. 1 is a front view of a robot on which an apparatus for controlling a mobile robot according to a first embodiment of this invention is premised.
Figure 2:
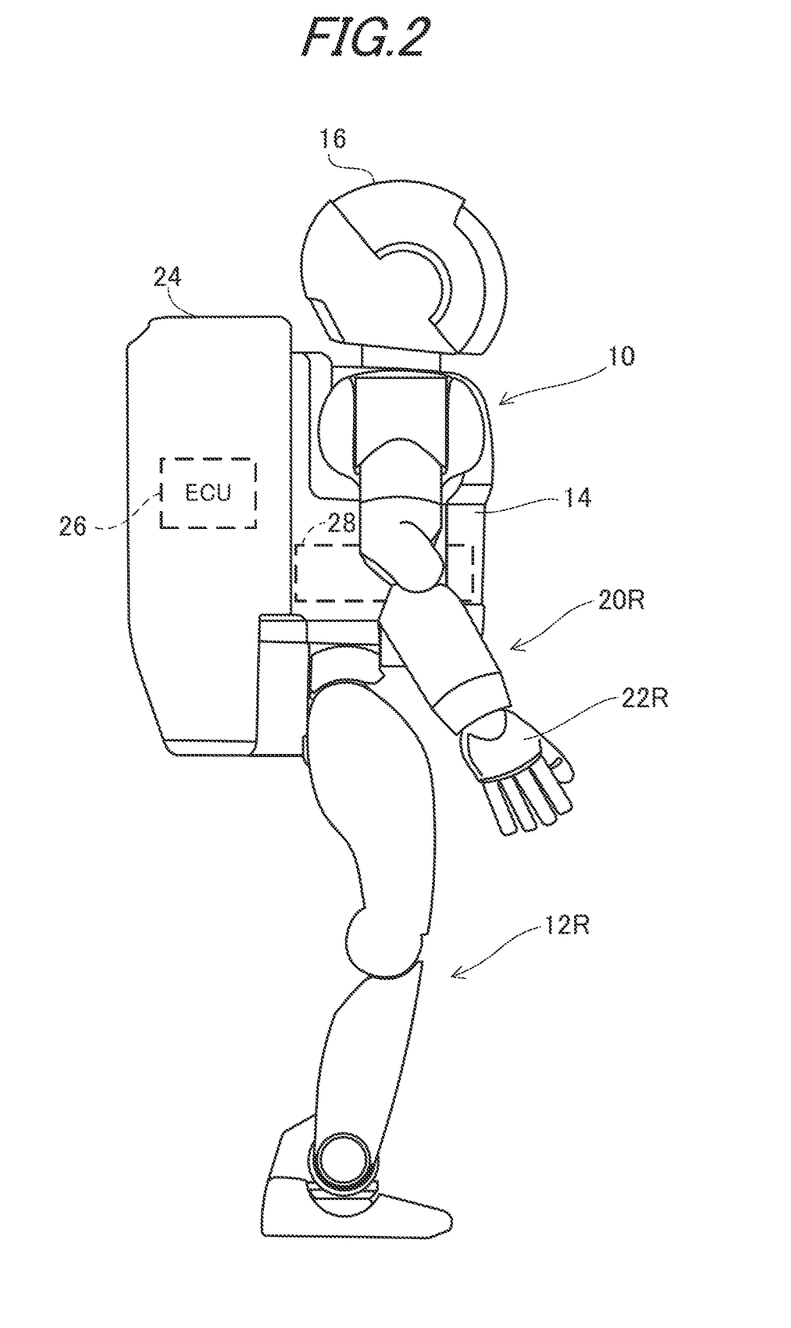
FIG. 2 is a side view of the robot shown in FIG. 1.
Figure 3:
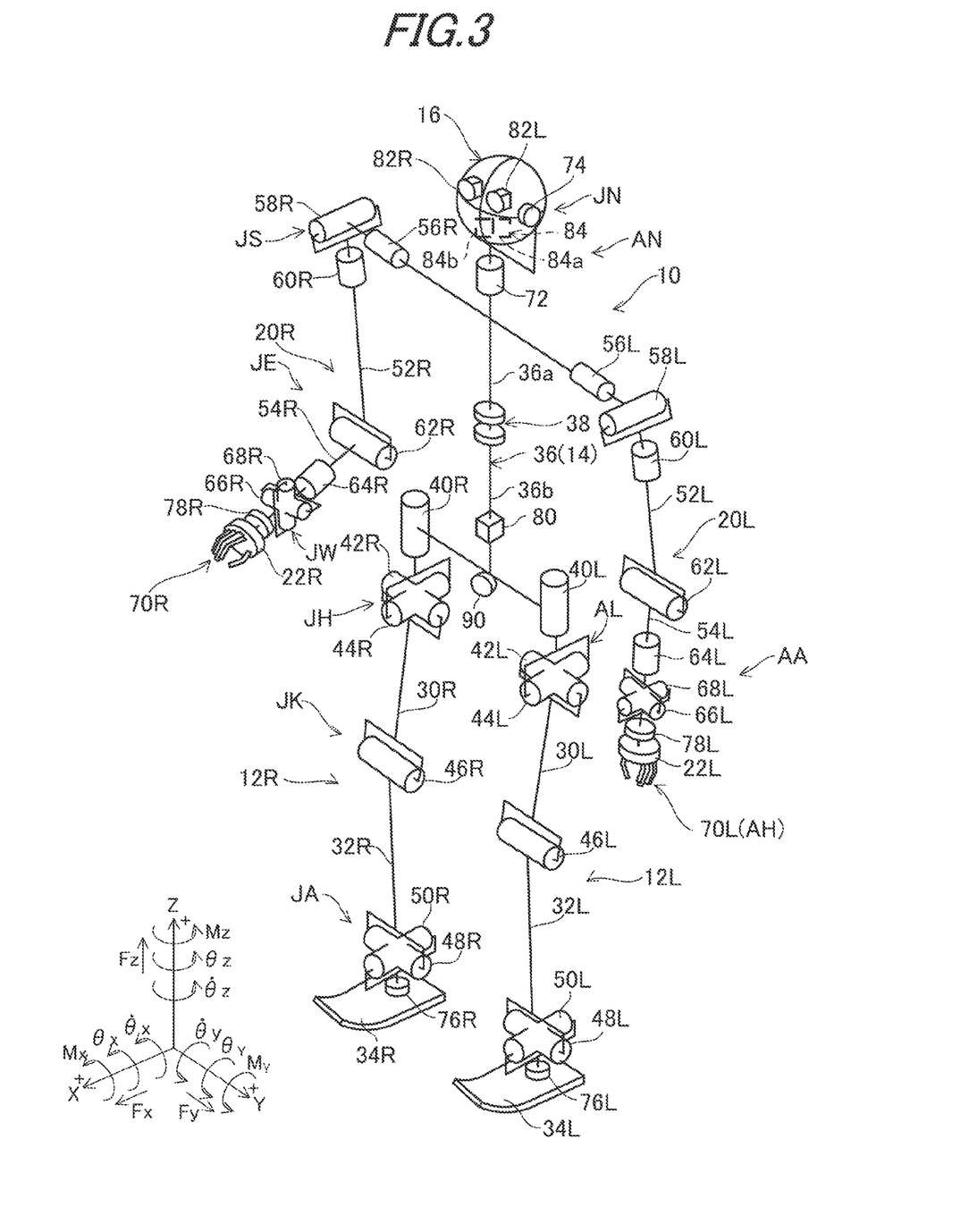
FIG. 3 is a schematic diagram showing the skeleton of the robot shown in FIG. 1.
Figure 4:
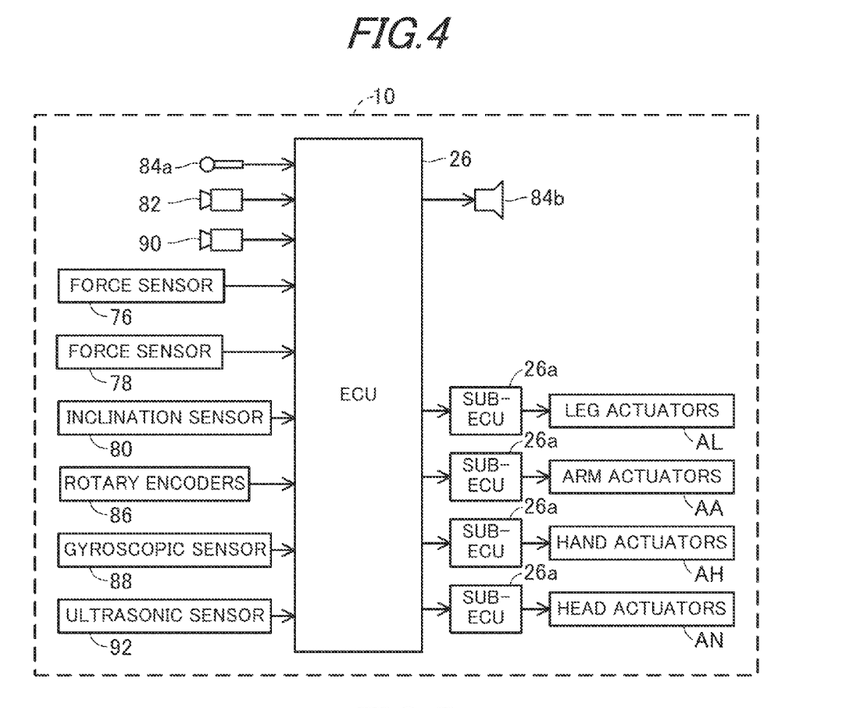
FIG. 4 is a block diagram showing input/output relations of an electronic control unit (ECU) shown in FIG. 2.

FIG. 1 is a front view of a robot on which an apparatus for controlling a mobile robot according to a first embodiment of this invention is premised; FIG. 2 is a side view of the robot shown in FIG. 1; FIG. 3 is a schematic diagram showing the skeleton of the robot shown in FIG. 1; and FIG. 4 is a block diagram showing input/output relations of an electronic control unit (ECU) installed in the robot shown in FIG. 1.

As shown in FIG. 1, a legged mobile robot (hereinafter sometimes called simply "robot") 10 is equipped with multiple (two) legs, namely with left and right legs (movement mechanisms) 12L, 12R (Here and hereinafter L and R are used to indicate left and right sides). The legs 12L, 12R are connected to the bottom of a body (trunk) 14. A head 16 is connected to the top of the body 14 and multiple (two) arms, namely left and right arms (work mechanisms) 20L, 20R are connected to opposite sides of the body 14.

Hands (end effectors) 22L, 22R are connected to the distal ends of the left and right arms 20L, 20R. In this embodiment, the mobile robot is exemplified by a humanoid legged mobile robot having two legs 12 and two arms 20 and stands to a height of approximately 1.3 m.

As shown in FIG. 2, a storage unit 24 is mounted on the back of the body 14. The storage unit 24 accommodates, inter alia, an Electronic Control Unit (ECU: controller) 26. A battery 28 is housed inside the body 14.

The internal structures of the robot 10 will be explained with reference to FIG. 3, with primary focus on the joints. Since the illustrated robot 10 is laterally symmetrical, affixation of L and R will be omitted hereinafter.

The left and right legs 12 are each equipped with a thigh link 30, a shank link 32, and a foot member 34. The thigh link 30 is connected to the body 14 through a hip (crotch) joint JH. The thigh link 30 and shank link 32 are connected through a knee joint JK, and the shank link 32 and foot member 34 are connected to through an ankle joint JA.

The body 14 is shown schematically in FIG. 3 as a body link 36. The body link 36 (body 14) comprises an upper section 36a and a lower section 36b connected through a joint 38 to be movable relative to each other, specifically to be capable of rotating or swiveling.

The aforesaid joints will be explained in terms of their electric motors (actuators). The hip joint JH comprises an electric motor 40 with a rotary shaft rotatable around a Z axis (yaw axis; gravity axis of the robot 10), an electric motor 42 with a rotary shaft rotatable around the Y axis (pitch axis; lateral axis of the robot 10), and an electric motor 44 with a rotary shaft rotatable around the X axis (roll axis; longitudinal axis of the robot 10) so as to have three degrees of freedom. Thus, the thigh link 30 is connected to the body 14 through the hip joint JH and can rotate relative to the body 14 around the X, Y and Z axes.

The knee joint JK comprises an electric motor 46 with a rotary shaft rotatable around the Y axis so as to have one degree of freedom. In other words, the thigh link 30 is connected to the shank link 32 through the knee joint JK and can rotate relative to the shank link 32 around the Y axis.

The foot (ankle) joint JA comprises an electric motor 48 with a rotary shaft rotatable around the Y axis and an electric motor 50 with a rotary shaft rotatable around the X axis so as to have two degrees of freedom. In other words, the shank link 32 is connected to the foot member 34 through the ankle joint JA and can rotate relative to the foot member 34 around the X and Y axes.

Thus, each of the left and right legs 12 has six rotary shafts (degrees of freedom) including three joints, so that overall the legs 12 have a total of twelve rotary shafts. In the following, the twelve actuators, i.e., the electric motors 40 etc., that drive the legs 12 are called the "leg actuators" and designated by a symbol AL. By controlling the operation of the leg actuators AL, desired movements are imparted to the legs 12.

The left and right arms 20 are each equipped with an upper arm link 52 and a forearm link 54. The upper arm link 52 is connected to the body 14 through a shoulder joint JS. The upper arm link 52 and forearm link 54 are connected through an elbow joint JE, and the forearm link 54 and hand 22 are connected through a wrist joint JW.

The shoulder joint JS comprises an electric motor 56 with a rotary shaft rotatable around the Y axis, an electric motor 58 with a rotary shaft rotatable around the X axis, and an electric motor 60 with a rotary shaft rotatable around the Z axis so as to have three degrees of freedom. Thus, the upper arm link 52 is connected to the body 14 through the shoulder joint JS and can rotate relative to the body 14 around the X, Y and Z axes.

The elbow joint JE comprises an electric motor 62 with a rotary shaft rotatable around the Y axis so as to have one degree of freedom. In other words, the upper arm link 52 is connected to the forearm link 54 through the elbow joint JE and can rotate relative to the forearm link 54 around the Y axis.

The wrist joint JW comprises an electric motor 64 with a rotary shaft rotatable around the Z axis, an electric motor 66 with a rotary shaft rotatable around the Y axis, and an electric motor 68 with a rotary shaft rotatable around the X axis so as to have three degrees of freedome. In other words, the forearm link 54 is connected to the hand 22 through the wrist joint JW and can rotate relative to the hand 22 around the X, Y and Z axes.

Thus, each of the left and right arms 20 has seven rotary shafts (degrees of freedom) including three joints, so that overall the arms 20 have a total of fourteen rotary shafts. In the following, the fourteen actuators, i.e., the electric motors 56 etc., that drive the arms 20 are called the "arm actuators" and designated by a symbol AA. By controlling the operation of the arm actuators AA, desired movements are imparted to the arms 20.

Each hand 22 is provided with five fingers 70. The fingers 70 are operable by a hand actuator AH (shown in FIG. 4), and by operating in coordination with movements of the arm 20 can grasp objects, point in a direction suitable for the occasion, and perform other actions.

The head 16 is connected to the body 14 through a neck joint JN. The neck joint JN comprises an electric motor 72 with a rotary shaft rotatable around the Z axis and an electric motor 74 with a rotary shaft rotatable around the Y axis so as to have two degrees of fredome. The head 16 can be faced in a desired direction by controlling the operation of head actuators AN, namely the electric motors 72 and 74.

The electric motors 40 and other motors comprising the leg actuators AL, arm actuators AA, hand actuators AH, and head actuators AN are all DC servomotors.

A force sensor (six-axis force sensor) 76 attached to each of the left and right legs 12 between the foot member 34 and ankle joint JA outputs signals representing the floor reaction force components Fx, Fy and Fz of three directions and the moment components Mx, My and Mz of three directions acting on the leg 12 from the floor. A similar force sensor 78 attached to each of the left and right arms 20 between the hand 22 and the wrist joint JW outputs signals representing external force components Fx, Fy and Fz of three directions and moment components Mx, My and Mz of three directions acting on the arm 20.

An inclination sensor 80 installed on the body 14 outputs signals indicating an inclination of the body 14 from the vertical axis, more specifically, state quantities of the body 14 such as its inclination angle and angular velocity. The head 16 is equipped with two (left and right) CCD cameras 82 for taking and outputting stereographic images of the robot 10 surroundings and with an speech input/output unit 84 comprising a microphone 84a and a speaker 84b.

As shown in FIG. 4, the electric motor 40 and other motors are individually provided with rotary encoders 86 (not shown in FIGS. 1 to 3) responsive to rotation angles to output signals proportional to the joint angles, and the body 14 is provided with gyroscopic sensors (yaw-rate sensors) 88 (not shown in FIGS. 1 to 3) for producing outputs representing the angular accelerations around the X, Y and Z axes, respectively.

As shown in FIG. 3, the body 14 is further equipped with a hip-level camera 90 that produces a near-infrared laser beam forward and downward, detects light reflected from objects on the floor, for example, and produces outputs indicating the distances to and directions of the detected objects.

As shown in FIG. 4, a number of ultrasonic sensors 92 (not shown in FIGS. 1 to 3) are arranged around the body 14. The ultrasonic sensors 92 radially emit ultrasonic signals into the surroundings and produce outputs indicating the directions, positions and distances of people and other obstacles present in the surroundings.

As shown in FIG. 4, the outputs of the sensors and the like are inputted to the ECU 26. The ECU 26 is a microcomputer including a CPU, input/output circuit, ROM, RAM, and the like, none of which are shown in the drawing. Based on the input values, the ECU 26 calculates control values (manipulated variables) as current values, and controls the operation of the leg actuators AL, arm actuators AA and the like by using drive circuits (not shown) to supply them with boosted voltages from a booster (not shown) that boosts (increases) the output of the battery 28.

The ECU 26 also functions as a control unit for controlling operation of the speech input/output unit 84, which by means of a suitable method recognizes the content of a human utterance inputted through the microphone 84a of the speech input/output unit 84, generates a response to the utterance, and utters the generated response from the speaker 84b.

Figure 5:
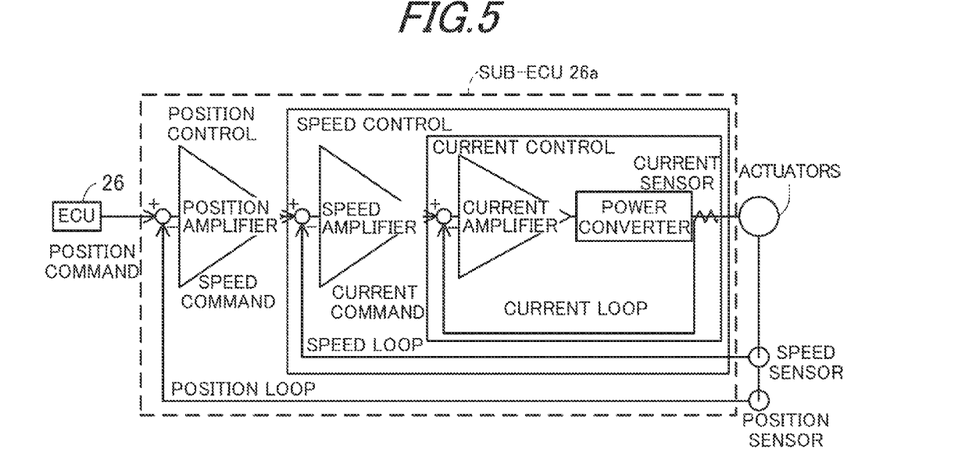
FIG. 5 is a block diagram showing the control system of the robot shown in FIG. 1.

FIG. 5 is a block diagram showing the control of the robot shown in FIG. 1.

As illustrated, the control system of this embodiment is concretely configured as a feedback control system composed of a distributed control system with a host system comprising the ECU 26 and a subordinate system comprising one or more sub-ECUs (controller) 26a deployed respectively at the leg actuators AL, arm actuators AA, hand actuators AH and head actuators AN. The ECU 26 and each of the sub-ECUs 26a can communicate with each other.

The sub-ECU 26a receives a command, more specifically a position command (desired value), from the ECU 26 and calculates a speed command by multiplying a deviation between an actual position obtained from outputs of the position sensor, i.e., outputs of the rotary encoders 86 deployed at the electric motors 40 or other associated motors, and the position command by a suitably calculated (retrieved) position gain Kp of a position amplifier. The sub-ECU 26a further calculates a current command by multiplying a deviation between an actual speed obtained from outputs of the speed sensor, i.e., outputs of the rotary encoders 86, and the calculated speed command outputted from the position amplifier by a suitably calculated speed gain Kv of a speed amplifier.

The sub-ECU 26a then calculates a control value (manipulated variable) by multiplying a deviation between actual current outputted from a power converter and detected by a current sensor (not shown in FIG. 4 etc.) and the calculated current command outputted from the speed amplifier by a suitably calculated current gain Ki of a current amplifier. As explained above, the sub-ECU 26a calculates control values using feedback control based on the commands (position command, calculated speed command, calculated current command) and detected values (actual position, actual speed, and actual current detected by sensors) and supplies them to the actuators, e.g., the electric motors 40, to control their operation.

Figure 6:
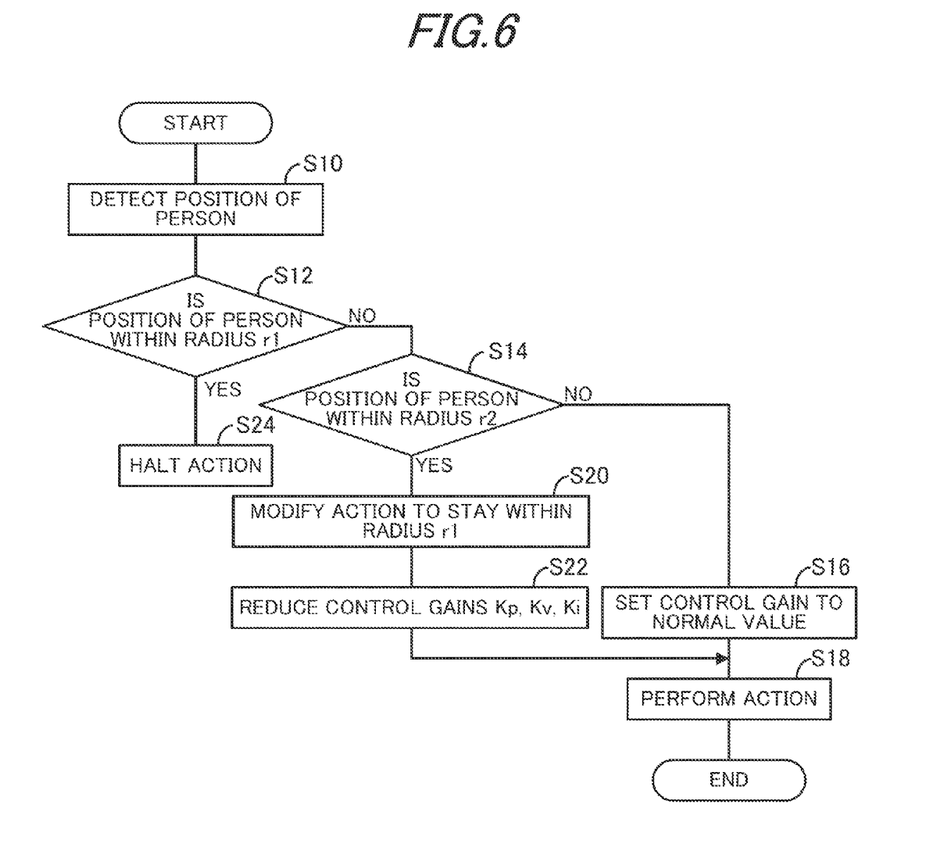
FIG. 6 is a flowchart showing operation of the apparatus for controlling the mobile robot according to the first embodiment.
Figure 7:
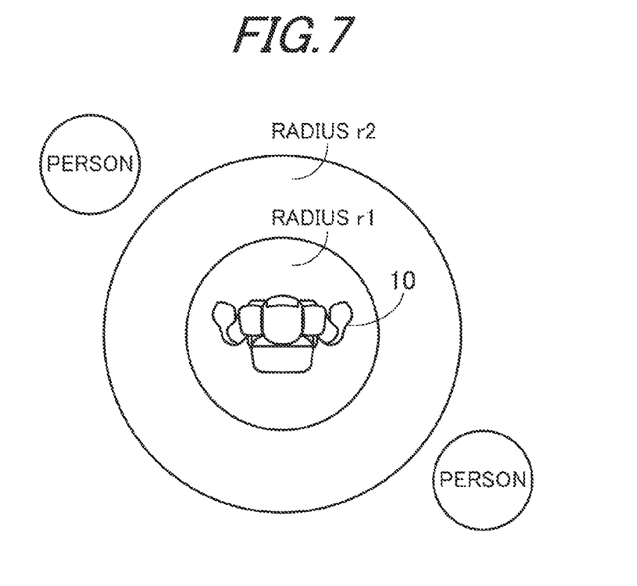
FIG. 7 is an explanatory view for explaining the processing of FIG. 6 flowchart.

FIG. 6 is a flowchart showing the operations of the mobile robot control apparatus according to the first embodiment, more specifically the operations of a sub-ECU 26a, and FIG. 7 is an explanatory view for explaining the processing of the flowchart.

The sub-ECUs 26a deployed at the leg actuators AL, inter alia, individually execute the program shown in the drawing at predetermined intervals (e.g., every 5 msec).

The flowchart is explained in the following. In S (Step: Processing step) 10, any person located in the vicinity of the subject unit (robot) 10 is detected. Specifically, any person located in the vicinity of the subject unit is detected based on the result of processing images obtained from the CCD cameras 82 mounted on the head 16 and the direction, position and distance of any obstacle obtained from the multiple ultrasonic sensors 92 deployed around the body 14.

Next, in S12, it is determined (decided) whether the position of a detected person is within a region of radius r1 (defining the first range) centered on the subject unit. When the result is negative, the program proceeds to S14, in which it is determined (decided) whether the position of the detected person is within a region of radius r2 (defining the second range) centered on the subject unit.

The radii r1 and r2 are shown in FIG. 7. The radius r1 (first range) is defined based on the length of the arms 20. Specifically, it is defined as a length (e.g., 0.8 m) approximately equal to the length of an arm 20 when either the left or right arm 20 is fully extended.

The radius r2 (second range) is defined as the gravity direction length of the robot 10, more exactly about the same length (e.g., 1.5 m) as, but slightly larger than, the height of the robot 10. As illustrated, the radius r1 is smaller than the radius r2 and defines a range closer to the subject unit.

When the result in S14 of FIG. 6 is also negative, meaning that no one is present in the vicinity of the subject unit, the program proceeds to S16, in which the control gains are set to the normal values. In other words, the position gain Kp, speed gain Kv, and current gain Ki explained with reference to FIG. 5 are set to values defined by the intended action plan. Next, in S18, actions are performed. In this case, actions specified in the intended action plan are performed normally.

When the result in S14 is affirmative, meaning that the position of a detected person is determined (decided) to be within the region of radius r2, the program proceeds to S20, in which the actions are modified to stay within the region of radius r1, namely, the actions of the leg actuators AL and arm actuators AA are modified to keep the actions of the legs 12 and arms 20 within the region of radius r1 (the intended action plan is modified).

Next, in S22, the control gains are reduced. Specifically, the position gain Kp, speed gain Kv and current gain Ki that determine the actions of the legs 12 and arms 20, more particularly, one thereof, are reduced to smaller values than specified in the intended action plan.

As explained earlier, the control values (applied current values) are calculated by multiplying the deviations between desired values and detected values of the leg 12 and arm 20 actions by control gains. Reducing the control gains therefore has the effect of lowering the generated torque thereof.

Next, in S18, actions are performed. In this case, actions specified in the intended action plan are performed within the range modified in S20.

When the result in S12 is affirmative, meaning that the position of a detected person is determined (decided) to be within the region of radius r1, the program proceeds to S24, in which the actions are halted. However, the actions of the head actuators AN and operation of the speech input-output unit 84 are not stopped because they have no direct bearing on contact with people.

It should be noted that, as in the second embodiment will be explained later, it is possible to add a processing step after S24 for using an LED (light-emitting diode; not shown in FIG. 4 etc.) to indicate that actions have been halted.

Figure 8:
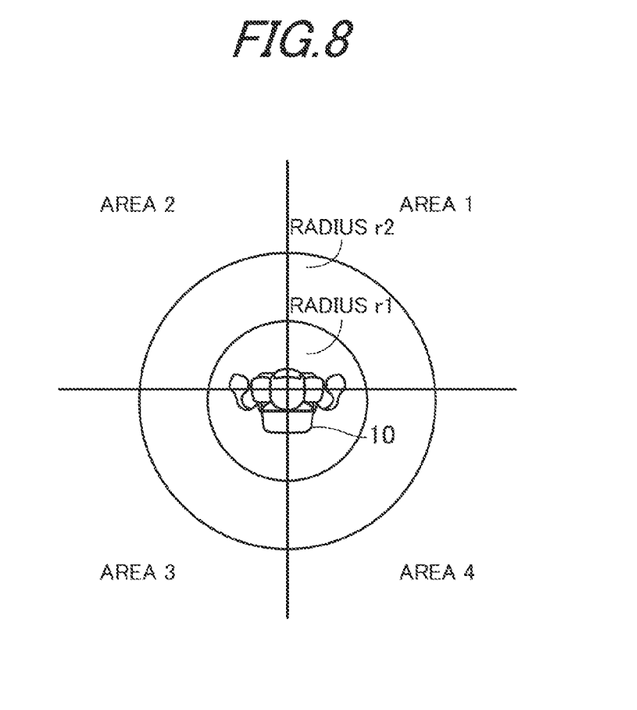
FIG. 8 is an explanatory diagrams similar to FIG. 7 showing modifications of the first embodiment.
Figure 9:
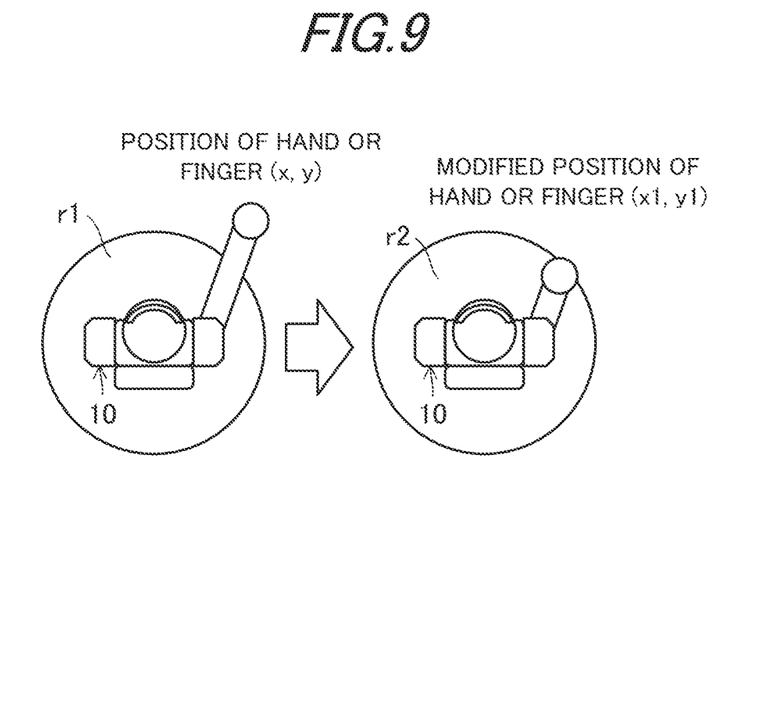
FIG. 9 is an explanatory diagrams similar to FIGS. 7 and 8 showing modifications of the first embodiment.
Figure 10:
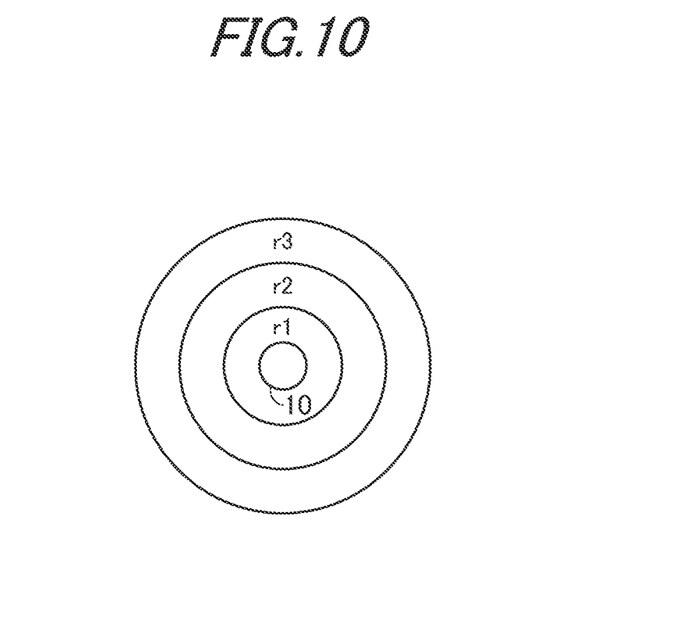
FIG. 10 is an explanatory diagrams similar to FIGS. 7 to 9 showing modifications of the first embodiment.

FIGS. 8 to 10 are explanatory diagrams similar to FIG. 7 showing modifications of the first embodiment.

In the case of FIG. 8, the region defined by radius r2 (second range) is subdivided (into areas 1, 2, 3 and 4 in the illustrated example) in which actions are regulated (restricted).

For example, when the position of a detected person is determined to be within the region of radius r2, specifically in a situation where the person is located in area 1 and a hand is to be extended into area 2, the regulation of actions of S20 is discontinued and the control gains are reduced in S22.

In contrast, in a situation where the detected person is in area 1 and a hand is to be extended within the region of radius r1, then, as shown in FIG. 9, the coordinates (x, y) are modified to keep the position of the end of the arm 20 (position of the hand 22 or fingers 70) within the region of radius r1. As a result, the regulation of actions is modified, and the control gains are reduced in S22.

In addition, as shown in FIG. 10, multistage radii r1, r2 and r3 can be defined to regulate actions and reduce control gains accordingly.

As explained above, the first embodiment is configured to determine whether the position of a detected person is within the region of radius r1 (first range) defined based on the length of the arms 20 or within the region of radius r2 (second range) defined based on the height of the robot 10 and to regulate actions of the legs 12 and arms 20 when the position is determined to be within the region of radius r1 or the region of radius r2. With this, even when the position of a person detected in the vicinity of the subject unit (robot) 10 is relatively near the subject unit, contact with the person can be effectively avoided. Moreover, the regulation of actions is limited to cases within the region of radius r1 and the region of radius r2, so that the actions of the legs 12 and the arms 20 are not regulated unnecessarily.

Further, the first embodiment is configured to halt actions of the legs 12 and arms 20 when the position of a detected person is determined to be within the region of radius r1 (first range). With this, even when the position of a person detected in the vicinity of the subject unit is so immediately near as to contact the work mechanisms of the robot, contact with the person can be effectively avoided.

Moreover, the first embodiment is configured to modify actions of the legs 12 and arms to keep them within the region of radius r1 (first range) when the position of a detected person is determined to be within the region of radius r2 (second range). With this, contact with the person can be effectively avoided and other intended actions can be continued.

Furthermore, the first embodiment is configured to reduce the control gains that determine at least one of the actions of the legs 12 and the arms 20. With this, the generated torque can be reduced, so that in the unlikely event of contacting a person, the impact of the contact can be mitigated.

Moreover, the first embodiment is configured to regulate at least one of the actions of the legs 12 and arms 20 by subdividing the region of radius r2 (second range). With this, in addition to the foregoing effects, actions can be more reliably regulated and unnecessary restrictions can be better avoided.

Figure 11:
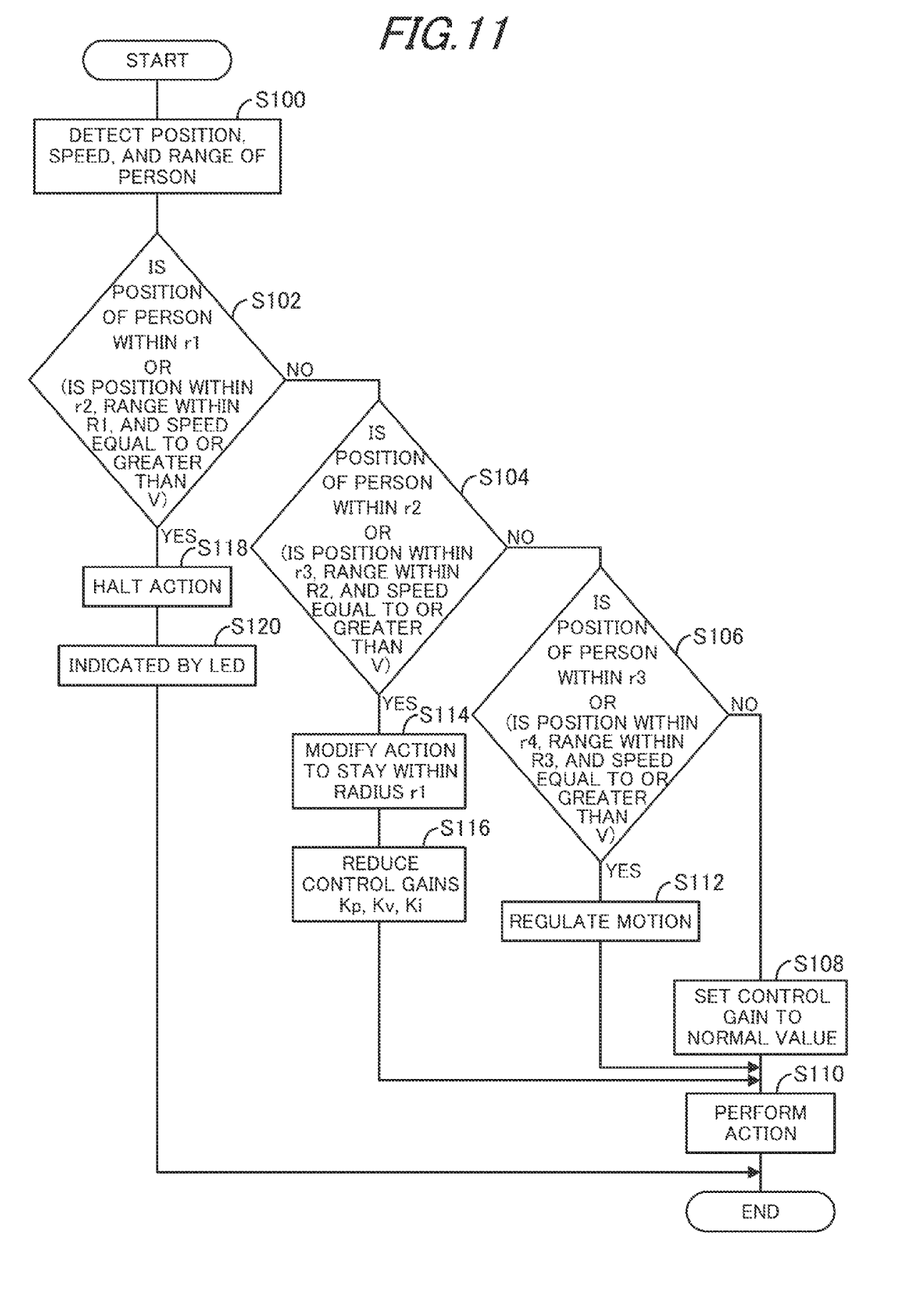
FIG. 11 is a flowchart showing operation of the apparatus for controlling the mobile robot according to a second embodiment.
Figure 12:
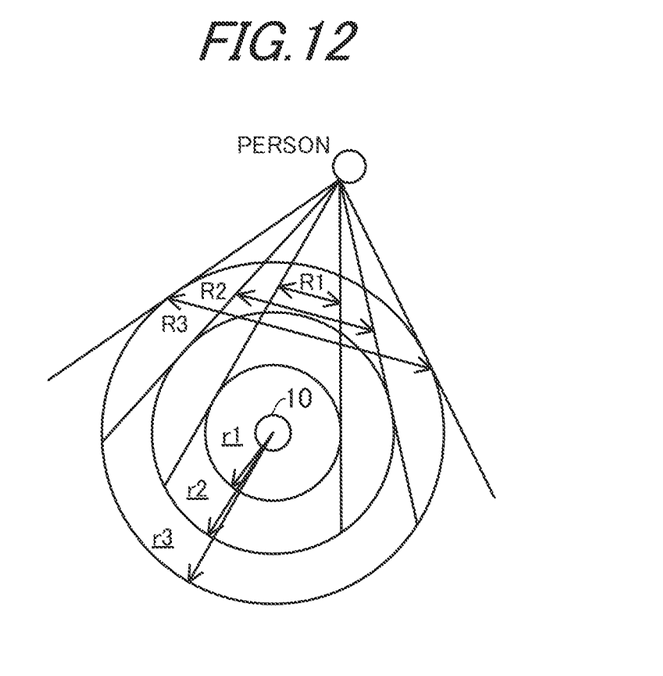
FIG. 12 is an explanatory view for explaining the processing of FIG. 11 flowchart.

FIG. 11 is a flowchart showing operations of an apparatus for controlling a mobile robot according to a second embodiment of this invention, more specifically operations of a sub-ECU 26a, and FIG. 12 is an explanatory view for explaining the processing of the flowchart.

In the second embodiment, as shown in FIG. 12, a radius r3 (defining a third range) is established in addition to a radius r1 (defining a first range) and a radius r2 (defining a second range) to be larger than the radius r2. The sizes of the radii r1 and r2 are the same as in the first embodiment. Moreover, the range of motion and moving speed of a person are detected in addition to the position of the person.

The flowchart is explained in the following. In S100, the position, moving speed and range of motion of any person located in the vicinity of the subject unit (robot) 10 are acquired (detected). Position is detected by a method like that of the first embodiment, and moving speed and range of motion are detected from change in the detected position with time.

Next, in S102, it is determined (decided) whether the position of a detected person is within the region of radius r1 (first range) centered on the subject unit, or whether the position of a detected person is within the region of radius r2 (second range) and the detected person's range of motion is within R1 and the detected person's moving speed is equal to or greater than a predetermined speed V.

As shown in FIG. 12, range of motion R1 means a sector-shaped range of motion relative to the robot 10 delineated by two lines drawn from the person tangent to the region of radius r1. The ranges R2 and R3 discussed below are similarly defined.

When the result in S102 is negative, the program proceeds to S104, in which it is determined (decided) whether the position of the detected person is within the region of radius r2 (second range) centered on the subject unit, or whether the position of the detected person is within the region of radius r3 (third range) and the detected person's range of action is within R2 and the detected person's moving speed is equal to or greater than a predetermined speed V.

When the result in S104 is negative, the program proceeds to S106, in which it is determined (decided) whether the position of the detected person is within the region of radius r3 (third range) centered on the subject unit, or whether the position of the detected person is outside the region of radius r3 and the detected person's range of motion is within R3 and the detected person's moving speed is equal to or greater than a predetermined speed V.

When the result in S106 is also negative, meaning that no one is present within the region of radius r3 around the subject unit, the program proceeds to S108, in which the control gains are set to the normal values, and to S110, in which actions, i.e., actions specified in the intended action plan, are performed normally.

When the result in S106 is affirmative, meaning that the position of the detected person is determined (decided) to be within the region of radius r3, for example, the program proceeds to S112, in which actions are regulated (restricted). More specifically, motion of the subject unit is regulated to within the region of radius r2 or region of radius r1.

Next, in S110, actions are performed. In this case, actions specified in the intended action plan other than the regulated motions are performed.

When the result in S104 is affirmative, meaning that the position of the detected person is determined (decided) to be within the region of radius r2, for example, the program proceeds to S114, in which the actions are modified to stay within the region of radius r1, namely, the actions of the leg actuators AL and arm actuators AA are modified to keep actions of the legs 12 and arms 20 within the region of radius r1 (the intended action plan is modified).

Next, in S116, the control gains are reduced. Specifically, the position gain Kp, speed gain Kv and current gain Ki that determine the actions of the legs 12 and arms 20, more particularly, one thereof, are reduced to smaller values than specified in the intended action plan.

Next, in S110, actions are performed. In this case, actions specified in the intended action plan are performed within the range modified in S114.

When the result in S102 is affirmative, meaning that the position of a detected person is determined (decided) to be within the region of radius r1, the program proceeds to S118, in which the actions are halted, except for the actions of the head actuators AN and operation of the speech input-output unit 84.

Next, in S120, the fact that actions were halted is indicated using an LED.

As explained above, the second embodiment is configured to detect (determine) the position, moving speed and range of motion of a person located in the vicinity and to regulate (restrict) actions of the legs 12 and arms 20 based on the person's position, moving speed and range of motion when the position of the detected person is determined to be within a range including the region of radius r1 and region of radius r2, more particularly within a range including the regions of radii r1, r2 and r3. With this, in addition to the effects pointed out regarding the first embodiment, actions can be more reliably regulated and unnecessary restrictions can be better avoided.

Figure 13:
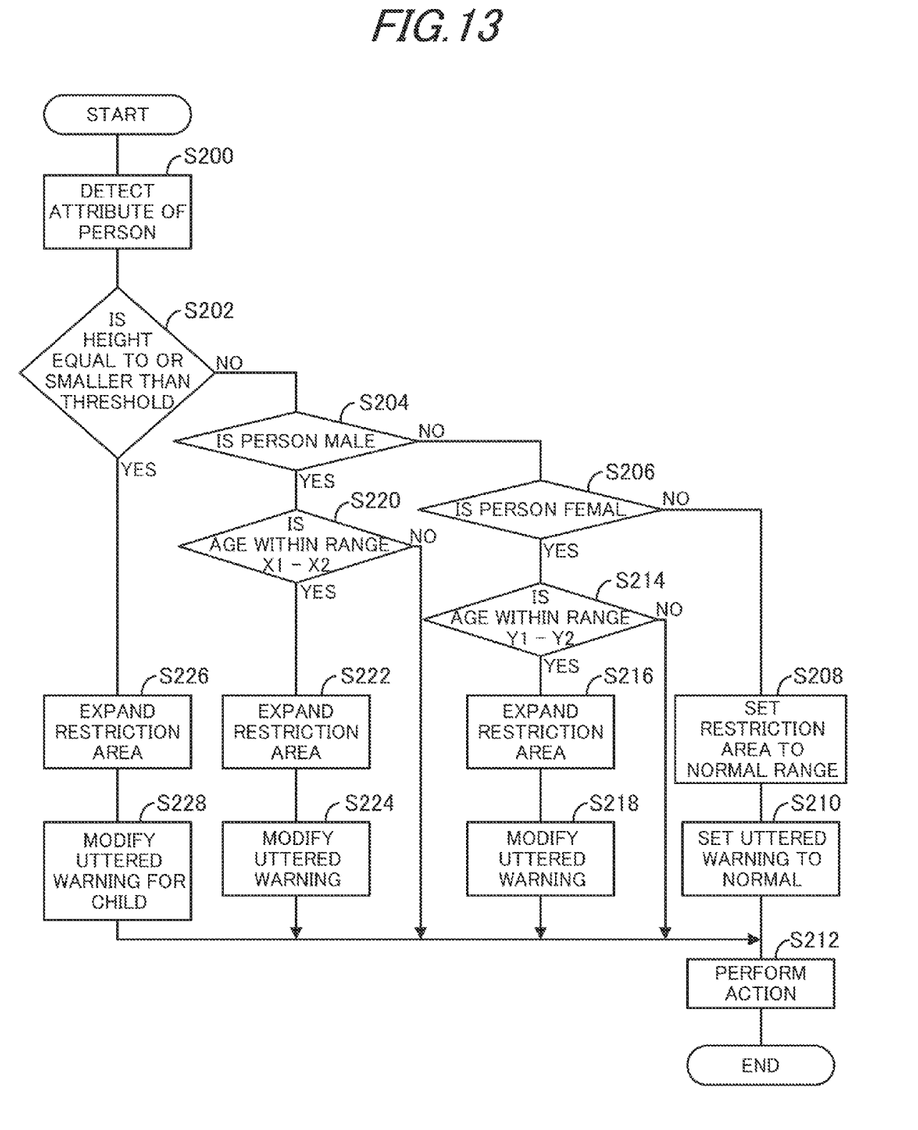
FIG. 13 is a flowchart showing operation of the apparatus for controlling the mobile robot according to a third embodiment.

FIG. 13 is a flowchart showing the operations of the apparatus for controlling the mobile robot according to a third embodiment of this invention, more specifically the operations of a sub-ECU 26a.

In the third embodiment, regulation (restriction) areas, namely, at least one among a region of radius r1 (first range), region of radius r2 (second range) and region of radius r3 (third range), are modified based on attributes of a person.

The flowchart is explained in the following. In S200, attributes of any person located in the vicinity of the subject unit (robot) 10 are acquired (detected), i.e., the height, sex and age of the person are acquired (detected). Specifically, the method of the first embodiment is applied to detect any person located in the vicinity of the subject unit 10, and the height, sex and age of the person is detected based on the result of processing images obtained from the CCD cameras 82 mounted on the head 16. The vicinity of the subject unit 10 is defined here as within the region of radius r3 (third range) of the second embodiment.

Next, in S202, it is determined (decided) whether the height of the detected person is equal to or smaller than a threshold value. The threshold value is defined as a value enabling discrimination of whether the person is a child.

When the result in S202 is negative, the program proceeds to S204, in which it is determined (decided) whether the detected person is a male. When the result in S204 is negative, the program proceeds to S206, in which it is determined (decided) whether the detected person is a female.

When the result in S206 is also negative, meaning that no restriction area or uttered warning message, discussed below, needs to be modified, the program proceeds to S208, in which the restriction areas are set to the normal ranges. Specifically, the regions of radii r1, r2 and r3 are set to the ranges established in the second embodiment.

Next, in S210, the uttered warning message is set to normal, e.g., "Please be careful. You are getting too close," and to S212, in which actions, i.e., actions specified in the intended action plan, are performed normally.

On the other hand, when the result in S206 is affirmative, meaning that the detected person is determined (decided) to be a female, the program proceeds to S214, in which it is determined whether her age is within the range specified by Y1-Y2 (e.g., 30 to 50 years of age), and when the result is affirmative, proceeds to S216, in which the restriction areas are expanded. In other words, since the detected person is presumed to be a relatively older (more curious) housewife, safety is more positively ensured by expanding the restriction areas.

Next, in S218, the uttered warning message is modified. For example, it is changed to, "Watch out! You are too close, madam." In other words, the response is modified according to the detected attributes so as to enhance safety while building a warmer relationship with the person. When the result in S214 is negative, S216 and S218 are skipped.

When the result in S204 is affirmative, meaning that the detected person is determined (decided) to be a male, the program proceeds to S220, in which it is determined whether his age is within the range specified by X1-X2 (e.g., 15 to 30 years of age), and when the result is affirmative, proceeds to S222, in which the restriction areas are expanded. In other words, since the detected person is presumed to be a young and active male, safety is more positively ensured by expanding the restriction areas.

Next, in S224, the uttered warning message is modified. For example, it is changed to, "You are too close, sir." Thus, the response is modified in response to age and sex so as to build a warmer relationship with the person. When the result in S220 is negative, S222 and S224 are skipped.

When the result in S202 is affirmative, meaning that the height of the detected person is determined (decided) to be equal to or less than the threshold value, the program proceeds to S226, in which the restriction areas are expanded. In other words, the probability of the detected person being a child is high, so safety is more positively ensured by expanding the restriction areas.

Next, in S228, the uttered warning message is modified. For example, it is changed to, "Now, be a good boy (girl). You might get hurt if come to close." Thus, the response is modified to give a friendlier feeling.

As mentioned above, the third embodiment is configured to detect attributes of a person located in the vicinity and modify (change) restriction (regulation) areas, e.g., the first range or the second range, based on the detected attributes of the person. Therefore, in addition to the foregoing effects, the ranges can be modified with consideration to, for example, the sex, age or the like of the person, so that actions can be more reliably regulated and unnecessary regulations can be better avoided.

As stated above, the first and second embodiments of this invention are configured to have an apparatus (and method) for controlling a mobile robot 10 having a body 14, movement mechanisms (legs) 12 for walking operation and work mechanisms (arms) 20 for working operation both connected to the body 14, a plurality of actuators (electric motors 40 ... 50, 56 ... 68 comprising the leg actuators AL, arm actuators AA, hand actuators AH, and head actuator AN) for driving the movement mechanisms and the work mechanisms, and a controller (ECU 26, sub-ECUs 26a) for controlling an action of the movement mechanisms and the work mechanisms through the actuators, wherein the controller comprises: a person detector that detects a person located in a vicinity of the robot (S10, S100); a position determiner that determines whether the position of the detected person is within a first range (region of radius r1) defined based on a length of the work mechanisms of the robot, or a second range (region of radius r2) defined based on a gravity length of the robot (S12, S14, S102, S1004, S106); and a regulator that regulates the actions of the movement mechanisms and the work mechanisms when the position of the detected person is determined to be within the first range or the second range (S20 to S24, S112 to S120).

With this, by defining the radii r1 and r2 (first and second ranges) based on the length of the arms (work mechanisms) of the robot 10 and the gravity length of the robot 10 (height) and regulating actions while comparing the position of the detected person with the ranges, contact with the person can be effectively avoided even when the person detected in the vicinity of the subject unit (robot) is relatively near the subject unit. Further, the regulation of actions is limited to cases within the first range and second range, so that the actions of the legs (movement mechanisms) 12 and the arms (work mechanisms) 20 are not regulated unnecessarily.

In the apparatus (and method), the regulator halts the actions of the movement mechanisms and the work mechanisms when the position of the detected person is determined to be within the first range (S12, S24, S102, S118).

With this, even when the position of a person detected in the vicinity of the subject unit is so immediately near as to contact the arms (work mechanisms) 20 of the subject unit, contact with the person can be effectively avoided by halting the actions.

In the apparatus (and method), the regulator modifies the actions of the movement mechanisms and the work mechanisms to keep them within the first region when the position of the detected person is determined to be within the second range (S14, S20, S104, S114).

With this, when the position of a person detected in the vicinity of the subject unit is outside the range of risk of contact with the arms (work mechanisms) 20, it is possible, by regulating the actions of the subject unit within the range of risk of contact with the arms (work mechanisms) 20, to effectively avoid contact with the person, and to continue intended actions other than these because no other actions are regulated (restricted).

In the apparatus (and method), since the regulator reduces control gains that determine at least one of the actions of the movement mechanisms and the work mechanisms (S14, S20, S22, S104, S114, S116), in addition to the foregoing effects, the generated torque of the arms (work mechanisms) 20 can be reduced, so that in the unlikely event of contacting a person, the impact of the contact can be mitigated.

In the apparatus (and method), as shown in FIGS. 8 and 9, since the regulator regulates at least one of the actions of the movement mechanisms and work mechanisms by subdividing the second region (radius r2), in addition to the foregoing effects, actions can be more reliably regulated and unnecessary restrictions can be better avoided.

In the apparatus (and method) further comprises a position/speed/range determiner that determines the position, moving speed, and range of motion of the person located in the vicinity of the robot, wherein the regulator regulates the action of the movement mechanisms and the work mechanisms based on the determined position, moving speed, and range of the motion of the person when the detected person is determined to be within a range (range of radii r1, r2, and r3) including the first range (region of radius r1) and the second range (region of radius r2) (S102 to S120).

With this, in addition to the foregoing effects, actions can be more reliably restricted and unnecessary restrictions can be better avoided.

In the apparatus (and method) according to the third embodiment of this invention further comprises an attribute detector that detects an attribute of the person located in the vicinity of the robot (S200), wherein the regulator changes the first range or the second range based on the detected attribute of the person (S202 to S228).

With this, in addition to the foregoing effects, the ranges can be modified with consideration to, for example, the sex, age or the like of the person, so that actions can be more reliably restricted and unnecessary restrictions can be better avoided.

It should be noted that, in the foregoing, although the positions and the like of the person are detected by the CCD cameras 82 and the ultrasonic sensors 92 mounted on the robot 10, this may be achieved by locating cameras or LRFs (Laser Range Finders) in a space (room) where the robot 10 moves and sending their outputs to the ECU 26 of the robot 10 through an appropriate way, e.g., wireless or the like.

Although the embodiment was explained taking a two-legged mobile robot as an example of the mobile robot, the robot is not limited to this type and the robot can instead be, for example, having more than two-legs or a wheels type or crawling type.

Japanese Patent Application No. 2012-145689, filed on Jun. 28, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A method for controlling a mobile robot having a body, movement mechanisms for walking operation and work arm mechanisms for working operation both connected to the body, a plurality of actuators for driving the movement mechanisms and the work arm mechanisms, and a controller for controlling an action of the movement mechanisms and the work arm mechanisms through the actuators, comprising the steps of:
    detecting a person located in a vicinity of the robot;
    determining whether a position of the detected person is within a first range defined based on a length of each work arm mechanism of the work arm mechanisms of the robot when the work arm mechanism is fully extended, or a second range defined based on a gravity direction length of the robot when standing erect; and
    regulating the actions of the movement mechanisms and the work arm mechanisms when the position of the detected person is determined to be within the first range or the second range.

2. The method according to claim 1, wherein the step of regulating the actions halts the actions of the movement mechanisms and the work arm mechanisms when the position of the detected person is determined to be within the first range.

3. The method according to claim 1, wherein the step of regulating actions modifies the actions of the movement mechanisms and the work arm mechanisms to keep actions of the movement mechanisms and the work arm mechanisms within the first region when the position of the detected person is determined to be within the second range.

4. The method according to claim 3, wherein the step of regulating the actions reduces control gains that determine at least one of the actions of the movement mechanisms and the work arm mechanisms.

5. The method according to claim 1, wherein the second region is subdivided into a plurality of areas.

6. The method according to claim 1 further including the step of:
    determining the position and a moving speed of the person located in the vicinity of the robot and determining a range of motion of the person located in the vicinity of the robot from change in the determined position with time,
    wherein the step of regulating actions regulates the actions of the movement mechanisms and the work arm mechanisms based on the determined position, moving speed, and range of the motion of the person when the detected person is determined to be within a range including the first range and the second range.

7. The method according to claim 1 further including the step of:
   detecting an attribute of the person located in the vicinity of the robot,
   wherein the step of regulating actions changes the first range or the second range based on the detected attribute of the person.

8. An apparatus for controlling a mobile robot having a body, movement mechanisms for walking operation and work arm mechanisms for working operation both connected to the body, a plurality of actuators for driving the movement mechanisms and the work arm mechanisms, and a controller for controlling an action of the movement mechanisms and the work arm mechanisms through the actuators,
   wherein the controller comprises:
   a person detector that detects a person located in a vicinity of the robot;
   a position determiner that determines whether a position of the detected person is within a first range defined based on a length of each work arm mechanism of the work arm mechanisms of the robot when the work arm mechanism is fully extended, or a second range defined based on a gravity direction length of the robot when standing erect; and
   a regulator that regulates the actions of the movement mechanisms and the work arm mechanisms when the position of the detected person is determined to be within the first range or the second range.

9. The apparatus according to claim 8, wherein the regulator halts the actions of the movement mechanisms and the work arm mechanisms when the position of the detected person is determined to be within the first range.

10. The apparatus according to claim 8, wherein the regulator modifies the actions of the movement mechanisms and the work arm mechanisms to keep actions of the movement mechanisms and the work arm mechanisms within the first region when the position of the detected person is determined to be within the second range.

11. The apparatus according to claim 10, wherein the regulator reduces control gains that determine at least one of the actions of the movement mechanisms and the work arm mechanisms.

12. The apparatus according to claim 8, wherein the second region is subdivided into a plurality of areas.

13. The apparatus according to claim 8 further comprises a position/speed/range determiner that determines the position, a moving speed, and a range of motion of the person located in the vicinity of the robot, the position/speed/range determiner determining the range of motion from change in the determined position with time,
   wherein the regulator regulates the actions of the movement mechanisms and the work arm mechanisms based on the determined position, moving speed, and range of the motion of the person when the detected person is determined to be within a range including the first range and the second range.

14. The apparatus according to claim 8 further comprises an attribute detector that detects an attribute of the person located in the vicinity of the robot,
   wherein the regulator changes the first range or the second range based on the detected attribute of the person.

* * * * *